United States Patent Office 3,439,007
Patented Apr. 15, 1969

3,439,007
N-(2,3-DIHYDROXYPROPYL)ALIPHATIC AMIDES
AND METHOD FOR PREPARING THE SAME
John Edward Milks, Stamford, Conn., assignor to Arizona
Chemical Company, New York, N.Y., a corporation of Delaware
No Drawing. Filed Jan. 14, 1965, Ser. No. 425,627
Int. Cl. C07c 103/16; C11c 3/00; C09k 3/16
U.S. Cl. 260—404        6 Claims The present invention relates to novel aliphatic amides and to methods for their preparation. More particularly, it relates to the preparation of N-(2,3-dihydroxypropyl) aliphatic amides and has as its principal object the provision of such aliphatic amides which find utility as effective antistatic agents.

In summary, the aliphatic amides of the present invention can be represented by the glycol amide structure:

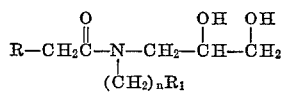

where R is hydrogen, alkyl or an alkenyl substituent, preferably, containing up to twenty-one carbon atoms, $n$ is an integer from 0 to 1 and $R_1$ is either hydrogen when $n$ is 0 or 1 or alkyl or an hydroxy-substituted alkyl substituent containing from one to seventeen carbon atoms when $n$ is 1. Advantageously, the aliphatic amides of the present invention can unexpectedly be prepared in a straightforward manner by reacting a glycidyl ester derived from an organic acid containing an α-carbon unbranched chain moiety with a nitrogen compound, such as ammonia or a primary amine in accordance with the following equation:

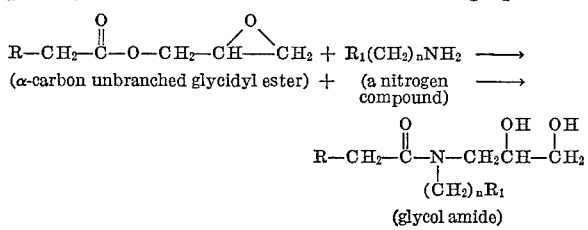

(glycol amide)

where $n$, R and $R_1$ are the same as defined above.

In general, equimolar proportions of the reactants can be employed herein. However, a molar excess of from 100% to about 300%, or more, of the amine is preferred to obtain optimum yield of desired glycol amide.

As illustrative glycidyl esters derived from acids containing α-carbon unbranched chain moieties, there may be mentioned: glycidyl acetate, glycidyl n-butyrate, glycidyl acrylate, glycidyl n-octanoate, glycidyl laurate, glycidyl myristate, glycidyl stearate, glycidyl oleate, glycidyl ester of tall oil fatty acids, glycidyl ester of soya bean fatty acid and glycidyl ester of coconut fatty acid.

The nitrogen reactants herein contemplated are represented by the formula: $R_1(CH_2)_nNH_2$, where $n$ is either zero (when $R_1$ is hydrogen) or one (when $R_1$ is a linear alkyl or an hydroxy-substituted linear alkyl substituent). Exemplary nitrogen compounds are, for instance, ammonia, methylamine, ethylamine, n-propylamine, n-butylamine, n-heptylamine, β-methylheptylamine, n-nonylamine, stearylamine, monoethanolamine, monopropanolamine and equivalents thereof.

In general, the above reaction may be carried out at temperatures ranging from about 20° C. to about 150° C., and preferably, from about 60° C. to about 100° C. for from about one to about ten hours. While the amide-forming reaction is conducted in the presence of an inert solvent when utilizing ammonia in at least a molar excess with respect to the glycidyl ester reactant.

The invention will be further illustrated by the following examples. These are merely illustrative and are not to be taken as limitative of the invention. Unless otherwise stated, the parts are by weight.

Example 1

A solution containing 11.6 parts of glycidyl acetate in 15 parts of ethanol by volume is treated in an autoclave with 19 parts of liquid ammonia for three hours at 60° C. After removing unreacted ammonia and solvent by distillation, a fraction (3.3 parts) is collected which boils at 193–196° C. at 0.6 mm. pressure. The latter fraction is identified as N-(2,3-dihydroxypropyl) acetamide from its elemental analysis and from its molecular weight by oxidation of the glycol group with periodic acid. On elemental analysis, the following (in percent) is observed.

Analysis.—Calc'd: C, 45.10; H, 8.27; N, 10.51 (mol. wt.=133). Found: C, 45.79; H, 8.20; N, 10.90 (mol. wt.=135).

Example 2

To a suitable reaction vessel fitted with a reflux condenser and thermometer is added 17 parts of glycidyl stearate, 34 parts by volume of acetonitrile and 9.2 parts of monoethanolamine. The mixture is heated at reflux temperature for five and one-half hours. Resultant product, N - (β - hydroxyethyl)-N-(2,3-dihydroxypropyl) stearamide, is separated from the solution by cooling. It is filtered and reprecipitated from acetonitrile to remove excess unreacted monoethanolamine. There is recovered 17.5 parts of N-(β-hydroxyethyl)-N-(2,3-dihydroxypropyl) stearamide having a softening point of 95°–100° C. The infrared spectrum showed only amide carbonyl absorption at 1607 cm.$^{-1}$. On the other hand, substantially no absorption is detected at 1730 cm.$^{-1}$ for an ester carbonyl group.

Example 3

A solution of 34 parts of glycidyl stearate, 68 parts by volume of acetonitrile and 21.9 parts of n-butylamine is heated under reflux for seven hours. Acetonitrile and excess amine are removed under reduced pressure so as to recover 42.1 parts of N-n-butyl-N-(2,3-dihydroxypropyl) stearamide, having a melting point equal to between 50° C. and 52° C. The infrared spectrum shows only amide carbonyl absorption at 1605 cm.$^{-1}$. Substantially no absorption is detected at 1730 cm.$^{-1}$ for ester carbonyl.

Example 4

A mixture of 34 parts of glycidyl stearate, 65 parts by volume of acetonitrile and 10 parts of liquid ammonia are heated to 75° C.–80° C. for seven hours in a rocking autoclave under autogenous pressure. Evaporation of the solvent and excess ammonia yields 34.5 parts of N-(2,3-dihydroxypropyl) stearamide having a melting point equal to 92° C.–97° C. The infrared spectrum shows only amide carbonyl absorption at 1627 cm.$^{-1}$.

Example 5

The procedure of Example 4 is repeated in every detail except that equal parts by weight of liquid ammonia and glycidyl stearate are heated in the absence of acetonitrile under pressure for seven hours at 85° C., followed by the removal of excess ammonia. Resultant product of the reaction is a powdery solid, N-(2,3-dihydroxypropyl) stearamide.

Example 6

Following the procedure of Example 5 in every detail except that the glycidyl ester of tall oil fatty acids is reacted with an equal weight of ammonia for seven hours at 85° C. A pasty-like solid, N-(2,3-dihydroxypropyl) tall oil fatty amide is obtained. The latter amide possesses a melting point of 50°–54° C.

Example 7

To demonstrate the antistatic effectiveness of the glycol amides of the invention, two parts of N-(2,3-dihydroxypropyl) stearamide, as illustrative of the glycol amides herein, are incorporated into 98 parts of high-density polyethylene using a two-roll rubber mill at 175° C. The plastic sample is then compression molded into a 2 x 2.5 x 0.05 inch film and conditioned for over 24 hours at 50% relative humidity. The sample is placed between two electrodes of a teraohmmeter (Type H from Rohde and Schwarz Company). A potential of 900 volts is applied for two minutes. The surface resistivity (in megohms) is measured.

The resistivity of the high-density polyethylene absent the added glycol amide is $50 \times 10^7$ megohms. On the other hand, in the presence of the added glycol amide, a resistivity of $90 \times 10^3$ megohms is recorded. At this resistivity level, good antistatic properties are imparted to the high density polyethylene.

I claim:

1. A process for preparing a glycol amide of the structure:

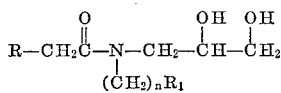

where R is a substituent selected from the group consisting of hydrogen, linear alkyl containing from 1 to 21 carbon atoms and linear alkenyl containing no more than three points of unsaturation and containing up to 21 carbon atoms, $n$ is an integer from 0 to 1, and $R_1$ is a substituent consisting of (a) hydrogen, (b) linear alkyl, (c) hydroxy-substituted linear alkyl, said alkyl containing from 1 to 21 carbon atoms, when $n$ is 1 and (d) hydrogen when $n$ is 0, which comprises the steps of: reacting at a temperature ranging from about 20° C. to about 150° C. and for a time from 1 hour to about 10 hours (a) a glycidyl ester of the structure:

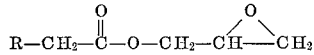

where R is as defined above with (b) a nitrogen compound of the structure:

where $n$ and $R_1$ are as above defined.

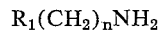

2. The process of claim 1 wherein the glycidyl ester is glycidyl acetate and the nitrogen compound is ammonia.

3. The process of claim 1 wherein the glycidyl ester is glycidyl stearate and the nitrogen compound is monoethanolamine.

4. The process of claim 1 wherein the glycidyl ester is glycidyl stearate and the nitrogen compound is n-butylamine.

5. The process of claim 1 wherein the glycidyl ester is glycidyl stearate and the nitrogen compound is ammonia.

6. The process of claim 1 wherein the glycidyl ester is glycidyl ester of tall oil fatty acids and the nitrogen compound is ammonia.

References Cited

UNITED STATES PATENTS 1,946,079   2/1934   Kern et al. _____ 260—404 X

OTHER REFERENCES

The Dow Chemical Co. "Alkanolamines Handbook," (1964) p. 30.

ALEX MAZEL, *Primary Examiner.*

R. V. RUSH, *Assistant Examiner.*

U.S. Cl. X.R.

260—561, 94.9

UNITED STATES PATENT OFFICE
CERTIFICATE OF CORRECTION

Patent No. 3,439,007                                                            April 15, 1969

John Edward Milks

It is certified that error appears in the above identified patent and that said Letters Patent are hereby corrected as shown below:

Column 1, lines 67 to 70, cancel "While the amide-forming reaction is conducted in the presence of an inert solvent when utilizing ammonia in at least a molar excess with respect to the glycidyl ester reactant." and insert -- While the amide-forming reaction is conducted in the presence of an inert solvent, as for instance, hexane, alcohol and acetonitrile, the reaction can, if desired, be carried out in the absence of a solvent when utilizing ammonia in at least a molar excess with respect to the glycidyl ester reactant. --. Column 4, lines 5 to 10, cancel "where R is as defined above with (b) a nitrogen compound of the structure: where n and $R_1$ are as above defined. $R_1(CH_2)_nNH_2$" and insert:

where R is as defined above with (b) a nitrogen compound of the structure:

$$R_1(CH_2)_nNH_2$$

where n and $R_1$ are as above defined.

Signed and sealed this 7th day of April 1970.

(SEAL)
Attest:

EDWARD M. FLETCHER, JR.                                  WILLIAM E. SCHUYLER, JR.
Attesting Officer                                                Commissioner of Patents